May 11, 1943.  R. TAMPIER  2,319,169
AIRCRAFT
Filed July 18, 1940
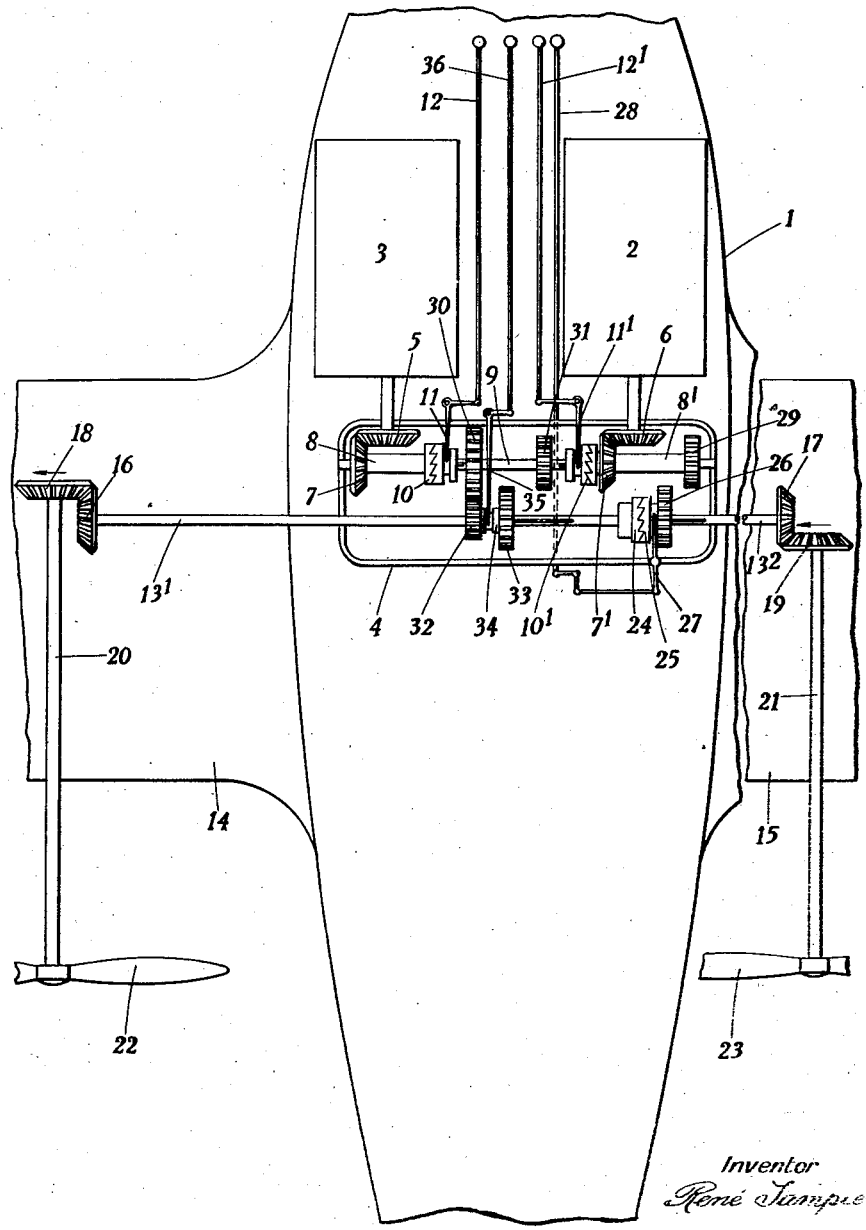
Inventor
René Tampier
by A. Knight Croad
Attorney Patented May 11, 1943

2,319,169

UNITED STATES PATENT OFFICE 2,319,169

AIRCRAFT

René Tampier, Cricklewood, London, England

Application July 18, 1940, Serial No. 346,196
In Great Britain April 25, 1940

2 Claims. (Cl. 244—60)

This invention relates to aircraft and in particular to the power transmission in aircraft.

The primary object of the invention is to provide a change-speed gear in the transmission by means of which the speed of revolution of the airscrew or airscrews may be adapted to the flight of the aircraft at different speeds and altitudes.

A further object of the invention is to provide an arrangement in which the drive from two engines can be transmitted commonly or separately to two airscrews.

The invention is illustrated diagrammatically in plan view in the accompanying drawing wherein in the fuselage 1 of an aircraft are disposed two engines 2, 3, the engine shafts of which project inside the casing 4 of a gear box and terminate in bevel gears 5, 6. The gear 5 meshes with a second bevel gear 7 solid on a sleeve 8 rotatably mounted on the power shaft 9 revolubly mounted in bearings in the casing 4. The other end of the sleeve 8 is solid with one part of a dog clutch 10, the complementary part of which is keyed on the power shaft 9 and has a peripheral groove engaged by a clutch lever 11 operable from the cockpit by a rod transmission 12. Similarly, the gear 6 meshes with a second bevel gear 7$^1$ solid on a sleeve 8$^1$ rotatably mounted on the power shaft 9, the other end of the sleeve 8$^1$ being solid with one part of a dog clutch 10$^1$, the complementary part of which is keyed on the power shaft 9, and has a peripheral groove engaged by a clutch lever 11$^1$ operable from the cockpit by a rod transmission 12$^1$.

The transmission shaft comprising two aligned parts 13$^1$, 13$^2$ disposed parallel to the power shaft 9 is also revolubly mounted in bearings and extends through both sides of the casing 4, into the wings 14, 15. Bevel wheels 16, 17 fixed respectively at the ends of the parts 13$^1$, 13$^2$ are in mesh respectively with bevel gears 18, 19 fixed to the ends of the shafts 20, 21 of two airscrews 22, 23 disposed behind the trailing edges of the wings. The two aligned parts of the transmission shaft are adapted to be connected together by a dog clutch comprising a part 24 fixed to the end of the part 13$^1$, and a part 25 splined or keyed to the other part 13$^2$. The part 25 is made solid with a gear wheel 26 and is grooved to receive a clutch lever 27 operable from the cockpit by a rod and pivoted lever transmission 28. When the clutch 24, 25 is disengaged the gear wheel can be moved into engagement with a gear wheel 29 on the power shaft 9 for the purpose hereinafter described.

A change speed gear is provided between the shafts 9 and 13$^1$, 13$^2$ and comprises two gear wheels 30, 31 of different diameters fixed on the power shaft 9, and two gear wheels 32, 33 also of different diameters carried on a sleeve 34 splined or keyed to the shaft 13$^1$, the sleeve 34 being formed with a peripheral groove engaged by a change speed lever 35 operable from the cockpit through a rod and pivoted lever transmission 36.

In operation, with the parts as shown the transmission shaft 13$^1$, 13$^2$ and airscrew shafts 20, 21 are driven at a speed higher than that of the engine shafts, both of which drive the transmission shaft through clutches 10, 10$^1$, power shaft 9, gears 30, 32 and clutch 24. If it is desired to reduce the speed of the two airscrews the transmission 36 is operated to slide the gears 32, 33 to the right, through a neutral position (in which both engines are disconnected from the transmission shaft), into a position in which the gear 33 engages the gear 31.

In the event of failure of one engine the corresponding clutch 10 or 10$^1$ is disengaged and both airscrews are then driven by the single engine remaining in operation.

If it be desired to drive the airscrews separately, each by one engine, the clutches 10$^1$ and 24 are disengaged and the clutch part 25 and gear 26 moved to the right, the latter to engage the gear 29. The engine 2 then drives the propeller 23 through gears 6, 7$^1$, sleeve 8$^1$, gears 29, 26 and the part 13$^2$ of the transmission shaft. The engine 3 may continue to drive the part 13$^1$ of the transmission shaft through the clutch 10 as above described.

The invention has the following advantages. By permitting of adapting the speed of revolution of the airscrew drive of an aircraft to different speeds of the aircraft and different altitudes an economy in fuel is obtained. Only a single gear box need be employed for more than one engine, and the arrangement described is such that both engines can turn at the same speed, this being of particular advantage when taking off, when differences in engine speed may affect the stability of the machine. In the event of failure of one engine, a second engine can be used to drive both airscrews, whilst the possibility of separately driving each airscrew is retained, for example when taxi-ing on ground or water.

The shafts between the engines and the gear box and/or between the gear box and airscrews, instead of being as shown may be of the kind described in my pending patent application Serial No. 342,328, or of any other kind.

The change speed gear may have more than two speed ratios if desired.

The details of construction may evidently be different from those shown in the drawing. For example, worm gears or other kinds of gear wheels and clutches other than dog clutches may be used. The gear box can comprise more than one part, each part containing one part of the gears.

More than two engines may be used. For example, two further engines may be arranged in the same fuselage and may drive airscrews disposed further from the fuselage than the two engines shown. More than one fuselage, each containing an engine or engines may be carried on the same wing.

What I claim is:

1. In an aircraft having a plurality of propellers, a plurality of power plants for driving the propellers, a driving shaft and operator controlled means to couple said driving shaft selectively to all or any selected one of said power plants, the combination of a transmission shaft comprising several parts each drivingly connected with one of said propellers, operator controlled means whereby all the parts of said transmission shaft can be drivingly connected with or disconnected from one another, a gear for coupling one part of said transmission shaft to said driving shaft, and means for drivingly connecting another part of said transmission shaft directly to one of said power plants.

2. In an aircraft having two propellers and two power plants for driving said propellers, the combination of a drive shaft, two sleeves on said drive shaft, means for driving each of said sleeves from one of said power plants, respectively, a gear wheel fixed on one of said sleeves, operator controlled clutches between said drive shaft and said sleeves, respectively, a transmission shaft comprising two alined parts, each drivingly connected to one of said propellers, respectively, an operator controlled clutch between said alined parts, a change speed gear between said driving shaft and one of said alined parts, a gear wheel rotatable with the other alined part, and means to bring said last mentioned gear wheel into driving mesh with said gear wheel on said sleeve thereby causing one of said propellers to be driven directly from one of said power plants without the use of the driving shaft.

RENÉ TAMPIER.